May 7, 1963   G. M. BROWN   3,088,256
METHOD OF PRODUCING A SLEEVE
Filed Aug. 10, 1959   3 Sheets-Sheet 1
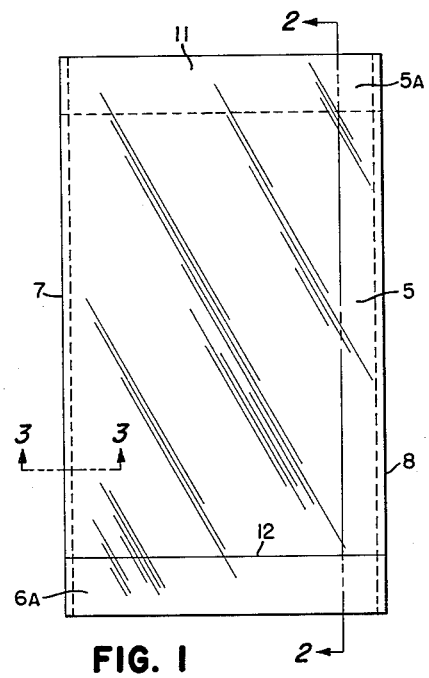
FIG. 1
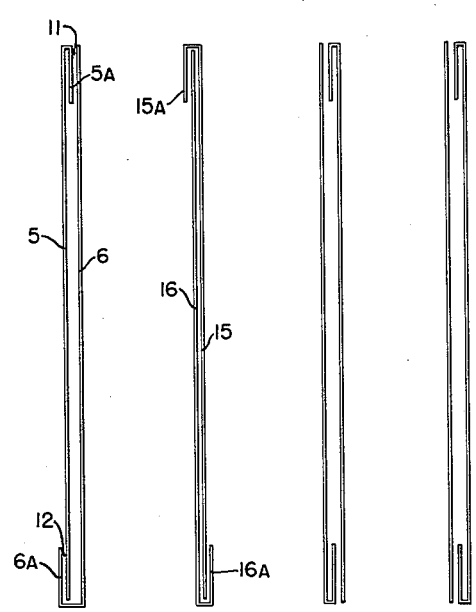
FIG. 2   FIG. 4   FIG. 5   FIG. 6
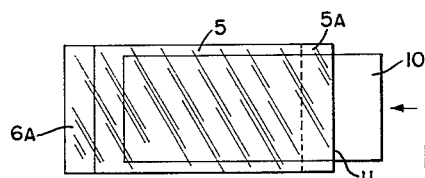
FIG. 1A
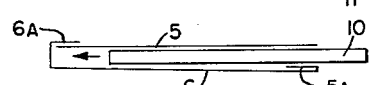
FIG. 1B
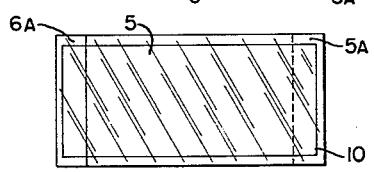
FIG. 1C
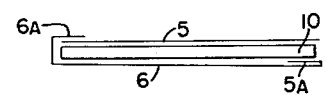
FIG. 1D
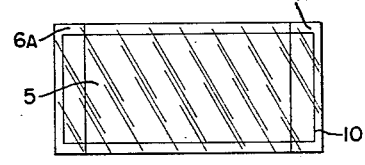
FIG. 1E
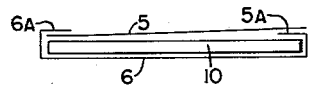
FIG. 1F
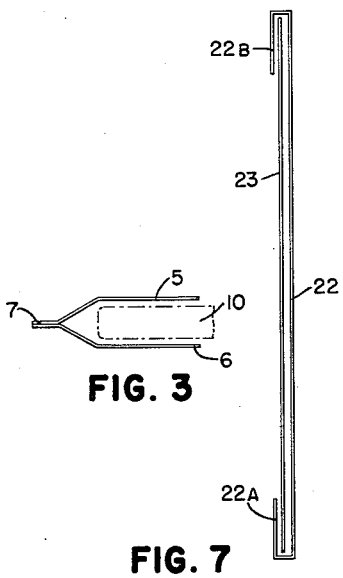
FIG. 3
FIG. 7
*INVENTOR.*
GEORGE M. BROWN
BY
*J. B. Holden*
ATTORNEY May 7, 1963  G. M. BROWN  3,088,256
METHOD OF PRODUCING A SLEEVE Filed Aug. 10, 1959  3 Sheets-Sheet 2

*INVENTOR.*
GEORGE M. BROWN
BY
*J. B. Holden*
ATTORNEY

May 7, 1963  G. M. BROWN  3,088,256
METHOD OF PRODUCING A SLEEVE
Filed Aug. 10, 1959  3 Sheets-Sheet 3

*INVENTOR.*
GEORGE M. BROWN
BY
J. B. Holden
ATTORNEY

United States Patent Office 3,088,256
Patented May 7, 1963

3,088,256
METHOD OF PRODUCING A SLEEVE
George M. Brown, Toronto, Ontario, Canada, assignor to The Goodyear Tire & Rubber Company, Akron, Ohio, a corporation of Ohio
Filed Aug. 10, 1959, Ser. No. 832,592
12 Claims. (Cl. 53—28)

This invention relates to an improved method of packaging in a sleeve.

The sleeve is made from two film webs joined together along the edges only. The mouths at the two ends of the sleeve are each closed by an unsealed flap. The two webs may be of the same or different compositions. Thus one web may be transparent and the other opaque; one web may be printed and the other not; etc. A wide variety of different sleeve structures can be made from films of different compositions.

A principal advantage in the sleeve structure is that the package is open at both ends. It is designed for the packaging of objects rather than granular material or liquid. Being open at both ends, it permits the escape of air from one end while the object is being introduced at the other end. Since the sleeve is open at both ends, any object packaged in it can be removed for inspection and then reinserted without damage to the sleeve.

A further advantage, if the sleeves are made in one place and the objects are packaged in another place, is that the objects packaged in the sleeves are held in the sleeves without either mouth thereof being sealed after the insertion of the object. Thus all the seals can be made at the factory where the sleeve is made and the only subsequent operation is the insertion of the object in the sleeve.

Alternatively, the sleeve is manufactured about the object, and this may be more satisfactory than inserting an object in the finished sleeve. Thus sleeves can be made around a plurality of spaced objects on a continuous basis on an automatic machine operating from two rolls of film.

The flaps at the mouths at opposite ends of a sleeve are each integral with a wall of the sleeve; one of the flaps may be integral with one wall and the other flap integral with the other wall, or both flaps may be integral with the same wall. There are two positions that the flaps may occupy. The flap may either overlap the wall to which it is not attached, or it may lie between the two walls.

The sleeves are rectangular and the flaps are rectangular. The two films from which the sleeves are made are sealed together by heat and pressure along their edges and the edges of the flaps are sealed with the edges of the walls. The operation is economical, the two pieces of film used being of the same or different widths and the seals being formed by heat. Furthermore, if one wall of the film and only one wall is printed, only that wall need go through the printing operation.

Various sleeve structures, their use and methods of manufacturing them about objects to be packaged are described in the accompanying drawings. These drawings are schematic, and it is to be understood that the flaps are generally folded flat and sections through the ends of the sleeves are not rectangular as shown. Furthermore, it is to be understood that the objects shown as being packaged are illustrative. They need not necessarily be rectangular.

The sleeves may, for example, be used for packaging a wide variety of objects including long narrow loaves of bread, flat packs of sliced bacon on a card or backing board, shirts and blouses of all kinds, stockings, flat games, cards such as greeting cards, jig saw puzzles, etc. The openings at the ends of the sleeves permit sufficient ventilation to prevent the formation of mold on baked goods, etc. while protecting all packaged objects from dust and damage due to frequent handling.

In the drawings—

FIG. 1 is a plan view of a sleeve;

FIGS. 1A to 1F are plan views and sections showing steps in the packaging of an object in the sleeve of FIG. 1;

FIG. 2 is a schematic section on the line 2—2 of FIG. 1;

FIG. 3 shows the seal at one edge of the sleeve on the line 3—3 of FIG. 1;

FIGS. 4 to 7 are schematic sections through sleeves of different constructions.

Figure 2A:
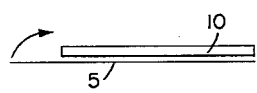
FIGS. 2A to 2C, 4A and 4B, 5A to 5D, 6A to 6C and 7A and 7B are schematic side views illustrative of the steps of forming the sleeves of FIGS. 2 and 4 to 7, respectively, about an object.

The sleeve of FIGS. 1 and 2 is made of two narrow film strips which form the front and back walls 5 and 6. Both films may be transparent or both may be opaque, or one may be transparent and one opaque. The flap 5a is integral with the wall 5 and the flap 6a is integral with the wall 6. The flap 5a is folded between the two walls and the flap 6a overlaps the wall 5. In manufacturing this sleeve to be shipped to another location where an object is to be inserted in it, the flaps are folded before the two walls are sealed along their opposite edges 7 and 8 and the edges of the flaps are sealed with the walls. The edges of the flap 5a are sealed between the two walls and the edges of the flap 6a overlie the edges of the wall 5.

FIGURES 1A to 1F illustrate how the object 10 is most conveniently packaged in this sleeve. It is introduced into the mouth 11 of the sleeve between the flap 5a and the wall 6. It is shown as fitting loosely into the sleeve, but in practice it will ordinarily form a relatively snug fit. In any commercial operation the object will be moved swiftly into the sleeve and there will be no hindrance due to accumulation of air because the air will be readily vented through the mouth 12 between the front wall 5 and the flap 6a.

After the object has been pushed within the confines of the sleeve as shown in FIGS. 1C and 1D, the only remaining step is to slip the flap 5a up over the end of the object which is the last to enter the sleeve.

It will be noted that in the completed package shown in FIGS. 1E and 1F, a flap covers each end of the object and keeps it from sliding from the package. The sleeve keeps the object clean and prevents it from having a shopworn appearance after display in a store. However, the package is not sealed and the object can readily be slipped out of the sleeve by changing the position of the flap 5a. After inspection the object can be re-inserted in the sleeve and thereafter the protection afforded is the same as when the object was first packaged in the sleeve.

Thus the sleeve is an efficient package and provides an efficient method of packaging. The air escapes from one end of the package as the object is being inserted in the other. Furthermore, after being completed the object can readily be removed for inspection and be easily repackaged.

The other sleeve designs shown in FIGS. 4 to 7 are of similar construction except for the location of the flaps. In the sleeve of FIGS. 4 and 7 both flaps are on the outside of the sleeves, and in FIGS. 5 and 6 the flaps are between the two walls of the sleeves. The difference in the figures is that in FIGS. 4 and 5 one flap is attached to each wall, whereas in FIGS. 6 and 7 both flaps are attached to the same wall.

The different designs recommend themselves for different types of packaging operations or for different types of manufacture. The sleeve shown in FIGS. 1 and 2 lends itself to filling after the sleeve has been manufactured. An object can be inserted most readily in the opening 11 at the end of the sleeve where the flap is between the two bag walls. The outside flap at the opposite end of the sleeve prevents the object from sliding through the sleeve. Also it permits air to escape while the object is being inserted into the sleeve.

The structures shown in FIGS. 4 and 7 require that one of the end flaps be turned back for manual filling. Both are designed especially for manufacture of the sleeve around an object by automatic machinery. This is readily done because the flaps both overlie their respective ends of the package. The flaps effectively retain the object within the package without any secondary operation of closure.

The sleeve construction of FIG. 5 lends itself to easy filling from either end, although it requires manipulation of the flaps after the article has been inserted to prevent the object from sliding out.

Similarly, the sleeve of FIG. 6 can easily be filled from either end. It is of particular value for packaging by automatic machinery. The flaps which are both integral with one wall are folded over the object before the opposite wall is laid over the object. Then the edges of the two walls are sealed together by heat and pressure with the edges of the flaps between them. The structures of both FIGS. 6 and 7 in which the flaps are both integral with one wall are obviously much better suited to automatic packaging than those in which one flap is integral with each wall.

A somewhat common difficulty in packaging in bags and sleeves of plastic films in which edges of opposite walls of a container are in flat contact at the mouth, is the tendency of the edges of the film to "block" or stick together at the mouth. The sleeves of this invention overcome this difficulty. Flaps on the outer surface of the sleeve are readily opened, and mouths where the flap is between the two sleeve walls (as at the opening 11 of FIG. 2 and both openings in FIG. 5) the fold where the flap joins its wall does not stick to the cut edge of the opposite wall as readily as where two cut edges are brought together.

The sleeves can be prefabricated or they can be formed around the objects to be packaged. The drawings on Sheet 2 which illustrate the steps in the manufacture of the different sleeves, preferably by automatic machinery, are all schematic. The flaps are generally folded back flat instead of at right angles as shown. Various types of heat-sealing devices may be used for forming the seals at the edges of the walls.

Figure 2B:
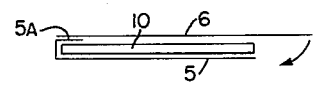
Figure 2C:
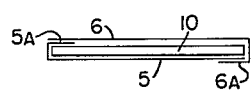

FIGURES 2A to 2C show how the package of FIG. 2 may be made around the object 10. The object is laid at one edge of the continuous web which forms the wall 5. In the next operation the opposite edge of the web is folded up around one end of the object in the direction indicated by the arrow in FIG. 2A to form the flap 5a, as illustrated in FIG. 2B. Then the web which forms the wall 6 is laid on the object and flap 5a as shown in FIG. 2B. The flap 6a is then formed around the other end of the object as illustrated in FIG. 2C and as indicated by the arrow in FIG. 2B.

The edges of the walls and flaps lie in flat contact with one another as illustrated in FIG. 3, and are sealed in two sealing operations, either successively or simultaneously—one being formed at each side of the object. The sealing units are advantageously located on opposite sides of a knife which cuts off successive sleeves as it seals the edges of the walls and flaps on opposite sides of it, or the cutting and sealing operation may be achieved simultaneously by the use of a hot wire or hot knife. The ends of the flap 5a are sealed between the edges of the two walls 5 and 6 and the edges of the flap 6a are sealed outside of the edges of the wall 5.

Figure 4A:
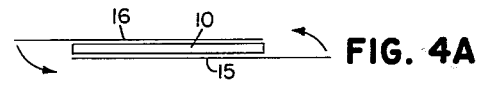
Figure 4B:
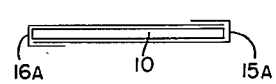

FIGURES 4A and 4B similarly illustrate the manufacture of the sleeve of FIG. 4 about the object 10. The web which is to form the wall 15 is first spread flat and the object 10 is placed on it with one edge of the object substantially coinciding with one edge of the film. Then the web which is to form the wall 16 is laid on top of this with one edge substantially coinciding with the opposite edge of the object. This is illustrated in FIG. 4A. Then the flap 15a is folded up around one end of the object and over the wall 16, and the flap 16a is folded down around the other end of the object and under the wall 15. The two walls and flaps are then sealed together.

Sleeves of the type shown in FIGS. 5 to 7 are similarly formed about the object 10 from continuous webs of packaging film in the manner shown schematically in drawings 5A to 5D, 6A to 6C, and 7A and 7B.

Figure 6A:
Figure 6B:
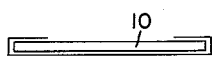
Figure 5A:
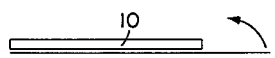
Figure 6C:
Figure 5B:
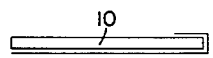
Figure 7A:
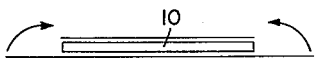
Figure 7B:
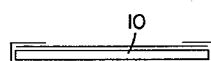
Figure 5C:
Figure 5D:
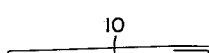

The arrows in FIGS. 6A and 7A show that in forming these types of sleeves, the bottom web is folded up away from the surface on which it rests. There is no necessity for folding a flap down under a package. The operation illustrated in FIGS. 7A and 7B has the advantage that the flaps are folded over the edges of the upper web, which is simpler than the operations of FIGS. 6A to 6C which necessitate folding the edges of the bottom web up over the ends of the spaced objects.

In forming each type of sleeve, as illustrated, a succession of objects are laid on one film web in spaced relation and then the other film web is placed on top of it. The edges of the webs are folded in the various different manners indicated in the drawings and then in one operation, or successive operations, the individual sleeves are formed by sealing the films together between the various objects and cutting the webs to separate the packaged objects.

Figure 8:
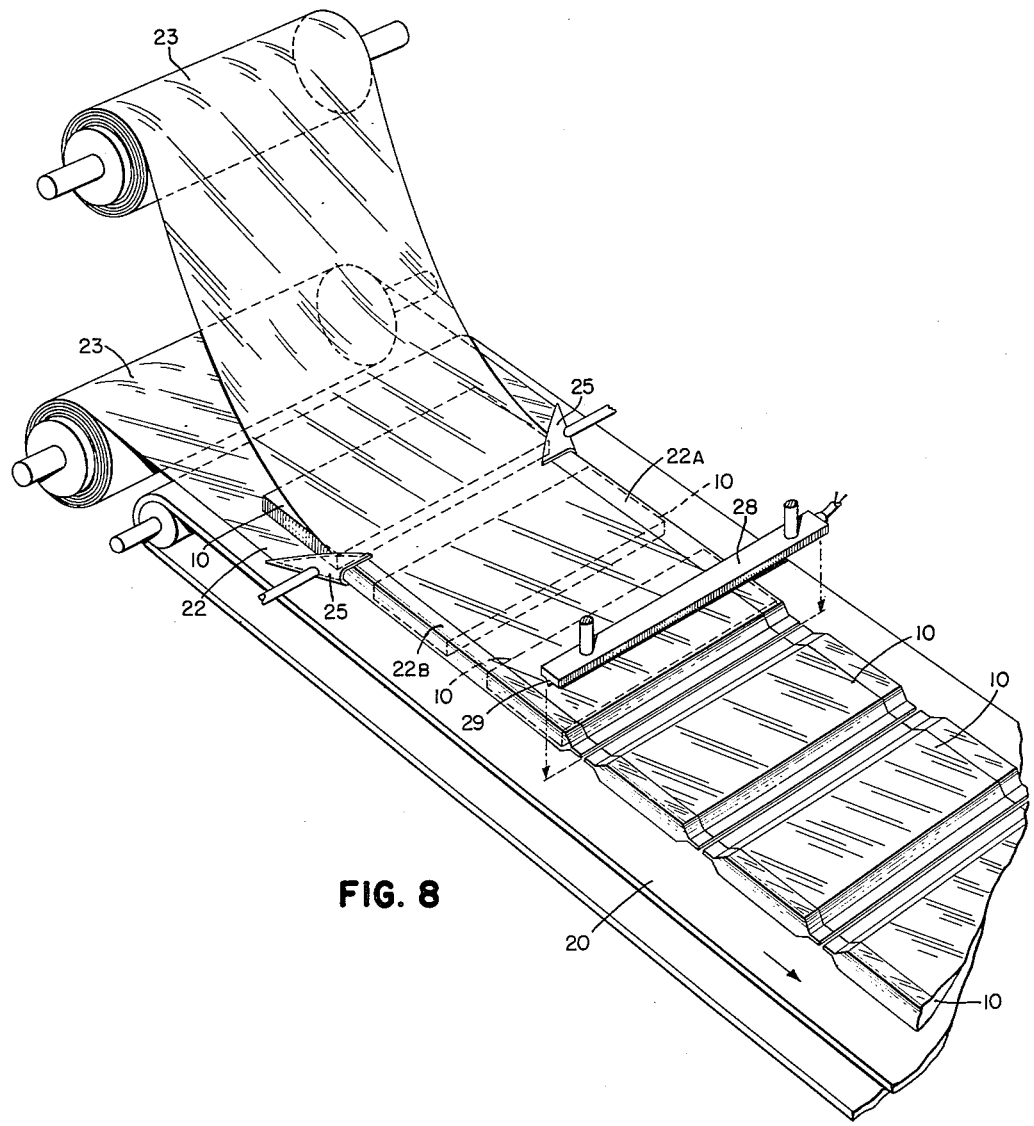
FIG. 8 illustrates schematically one method of forming the sleeve of FIG. 7.

Further details of making the sleeve of FIGURE 7 are illustrated in FIGURE 8. The belt 20 supports the film webs, etc. and carries them forward as the package is being formed. The lower web 22, unrolled on to the belt is somewhat wider than the upper web 23, because both flaps 22a and 22b are formed from the lower web. The objects 10 are placed in spaced relation (manually or by automatic machinery) on the web 22 and covered by web 23. The plough folders 25 fold the flaps 22a and 22b up over the ends of the objects on to the top of the edges of the web 23.

The sealer and cutter bar 28 is reciprocated vertically by means not shown. The cutter 29 on the bottom of the bar 28 may be a knife blade or a hot cutting wire. Areas on both sides of the cutter 29 are heated to a sufficient temperature to seal the two webs 22 and 23 together each time the cutter bar 28 is pressed down against the webs. It is pressed between each two packages. This seals the sides of the sleeve and seals the edges of the flaps to the sleeve, and simultaneously cuts the individual packages apart.

The drawing shows the cut edges of the sleeves extending from the middle of the sides of the packaged objects, instead of being flat against the belt. This may be done by locating a stationary bar between the belt and the bottom web, with the belt moving under it and the bottom web sliding over it. The edge toward the oncoming packages will be beveled so that the objects on web 22 will easily slide over it; or this bar may be pressed against the belt and lower it here, and the oncoming belt may be held substantially level with the top of this bar by a roller under the belt. In this case a roller might be used above the belt also rather than a bar. Alternatively the bars could be attached or integral with the belt and spaced as required to accommodate the objects that are being packaged. Any suitable means may be employed, and if the object is relatively thin nothing of the sort is necessary.

It is not essential to cut the packages apart and they may be left attached where multi-unit sales are desired.

Preforations may be provided to assist in separating the sleeves, instead of cutting them apart, if a multi-unit package is to be displayed with knowledge that individual sales may be made from it.

When the films are united at the edges by heat, and the flaps are heat sealed to them, the adjoining film surfaces coalesce together.

The invention is covered in the claims which follow.

What I claim is:

1. The method of packaging an object in a sleeve which comprises spreading a sheet of heat-sealable packaging film flat to form one wall of the sleeve, placing an object in contact with it, placing another sheet of heat-sealable packaging film over the object to form the other wall of the sleeve, and folding a flap from said sheets over each end of the object without sealing either flap to either sheet, and extending the end of the flap from one end of the object toward the other end of the object, and sealing together the films along opposite sides of the object and the edges of the flaps by heat and pressure.

2. The method of claim 1 in which one of said flaps is folded outside of the wall to which it is not attached.

3. The method of claim 1 in which one of said flaps is folded over the object before the film of which said one flap is not a part, is put in place.

4. The method of packaging an object in a sleeve which comprises spreading a sheet of heat-sealable packaging film flat to form one wall of the sleeve, placing an object in contact with it, folding opposite edges of the film as flaps over opposite ends of the object, and extending the end of the flap from one end of the object toward the other end of the object, placing a second sheet of heat-sealable packaging film over the object and said flaps to form the other wall of the sleeve, and then sealing the two films along the two sides of the object together by heat and pressure with the edges of both of said flaps between them, all without closing the flaps by sealing either flap to either sheet.

5. The method of packaging an object in a sleeve which comprises spreading a sheet of heat-sealable packaging film flat, placing an object in contact with it, placing a second sheet of heat-sealable packaging film over the object and folding opposite edges of the first film as flaps over the ends of the object and the second film, and extending the end of the flap from one end of the object toward the other end of the object, and then sealing the edges of said flaps and the edges of said respective films along the sides of the object together with heat and pressure, all without closing the flaps by sealing either flap to either sheet.

6. The method of packaging objects by forming sleeves about them, which comprises drawing a continuous web of heat-sealable film from a source thereof and placing objects in spaced relation thereon, drawing another web of heat-sealable film from a source thereof and covering the objects and continuously folding flaps from at least one of said webs over opposite ends of the objects without sealing either flap to either sheet, and extending the end of the flap from one end of the object toward the other end of the object, and then by heat and pressure successively sealing said films and flaps together between each two objects and cutting the packaged objects apart.

7. The method of forming a sleeve which comprises spreading a sheet of heat-sealable packaging film with opposite parallel edges flat to form one wall of the sleeve, placing a second sheet of heat-sealable packaging film with opposite parallel edges over the first sheet with said edges of the two sheets parallel, folding a flap from said sheets at each end thereof between the aforesaid parallel edges and without sealing either flap to one of said sheets sealing together both (1) said parallel edges and (2) the edges of the flaps by heat and pressure.

8. The method of claim 7 in which a flap at one end of the sleeve is folded outside of the wall to which it is not attached.

9. The method of claim 7 in which one of said flaps is folded inside of the wall to which it is not attached.

10. The method of claim 7 in which at least one of the flaps is folded before the second sheet is brought into contact with the first sheet.

11. The method of claim 7 in which the second sheet is brought into contact with the first sheet before one of the flaps is folded, and that flap on the first sheet is folded over the second sheet.

12. The method of forming sleeves which comprises drawing a continuous web of heat-sealable film with parallel edges from a source thereof, drawing another web of heat-sealable film with parallel edges from a source thereof, and bringing the films together with said edges parallel to one another, folding a flap from at least one film at each of said parallel edges without sealing either flap to either film, and then by heat and pressure sealing the films and flaps together along lines perpendicular to said parallel edges to form a multiplicity of sleeves.

References Cited in the file of this patent

UNITED STATES PATENTS

| | | |
|---|---|---|
| 2,069,549 | Hutt et al. | Feb. 2, 1937 |
| 2,162,230 | Salfisberg | June 13, 1939 |
| 2,401,109 | Rohdin | May 28, 1946 |
| 2,533,554 | Byerly | Dec. 12, 1950 |
| 2,606,412 | Salfisberg | Aug. 12, 1952 |
| 2,759,200 | Johnson | Aug. 21, 1956 |
| 2,764,280 | Carper | Sept. 25, 1956 |
| 2,873,566 | Sylvester et al. | Feb. 17, 1959 |
| 2,946,167 | Clemens | July 26, 1960 |
| 3,022,613 | Powers | Feb. 27, 1962 |